(12) United States Patent
Hofer

(10) Patent No.: US 7,540,825 B2
(45) Date of Patent: Jun. 2, 2009

(54) DRIVE SYSTEM OF A WORKING VEHICLE

(75) Inventor: Jürgen Hofer, Großbundenbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/740,454

(22) Filed: Apr. 26, 2007

(65) Prior Publication Data

US 2007/0187207 A1   Aug. 16, 2007

Related U.S. Application Data

(62) Division of application No. 11/097,842, filed on Apr. 1, 2005, now Pat. No. 7,240,489.

(30) Foreign Application Priority Data

Apr. 2, 2004   (DE) .................. 10 2004 016 242

(51) Int. Cl.
*B60T 7/12* (2006.01)
(52) U.S. Cl. .......................... 477/196; 477/40; 477/50; 477/182; 477/905; 180/307; 60/446
(58) Field of Classification Search ................... 477/38, 477/40, 50, 182, 184, 186, 187, 189, 195, 477/196, 905; 60/426, 446, 448, 449, 451, 60/490; 180/305, 307, 308
See application file for complete search history.

(56) References Cited

U.S. PATENT DOCUMENTS

| | | | | | |
|---|---|---|---|---|---|
| 4,317,331 | A * | 3/1982 | Aruga et al. | ................... | 60/436 |
| 4,505,355 | A * | 3/1985 | Scheurenberg et al. | ...... | 180/308 |
| 5,848,664 | A * | 12/1998 | Kaspar | ........................ | 180/308 |
| 6,202,783 | B1 * | 3/2001 | Taylor et al. | ................. | 180/305 |
| 6,648,091 | B2 * | 11/2003 | Tanabe | ........................ | 180/197 |
| 7,210,293 | B2 * | 5/2007 | Fukasawa et al. | ............. | 60/487 |

* cited by examiner

*Primary Examiner*—David D. Le

(57) ABSTRACT

A drive system of a working vehicle including a main engine drivingly connected to a hydraulic pump. The hydraulic pump is connected to first and second hydraulic motors. When an undesirable operating condition is detected, a control device shifts an actuator associated with at least one of the wheels, to reduce the displacement volume of the hydraulic motors driving that wheel. In addition, shifts are made in the actuator of the respective other hydraulic motor and/or in the actuator of the hydraulic pump, in order to maintain a constant speed of travel. The control device shifts the actuator of the hydraulic motor of the other wheel toward greater displacement, and if that shift is insufficient to compensate for the undesirable operating condition, the control device will shift the actuator of the hydraulic pump in the direction of reduced displacement volume.

3 Claims, 3 Drawing Sheets

DRIVE SYSTEM OF A WORKING VEHICLE

CROSS REFERENCE TO RELATED APPLICATION

This application is a division of applicant's application U.S. Ser. No. 11/097,842 filed 1 Apr. 2005 now U.S. Pat. No. 7,240,489 and titled DRIVE SYSTEM OF A WORKING VEHICLE, which application is pending.

FIELD OF THE INVENTION

The invention relates to a drive system of a working vehicle. The drive system is comprised of a main engine which is drivingly connected to a hydraulic pump that has a displacement volume which is variable by means of an actuator. The pump is drivingly connected to a first hydraulic motor, which is drivingly connected to at least one wheel that engages the ground. The displacement volume of the motor is variable by means of an actuator. The pump is also connected to a second hydraulic motor, which is drivingly connected to at least one wheel, of another axle, that engages the ground. The displacement volume of said second hydraulic motor is variable by means of an actuator. The actuators are connected to a control device that is connected to a sensor for sensing the position of a device for setting the speed, which speed-setting device may be a control lever. The control device can be operated to adjust the actuators in response to the setting of the speed-setting device. When an undesirable operating condition is detected at least one of the wheels, said control device can be operated to adjust the actuator associated with that wheel(s). In the direction toward reduced displacement volume of the [respective] hydraulic motor, in order to cure the undesirable operating condition by reducing the rotational speed of the wheel(s). The control device can also be operated to shift the actuator of the respective other hydraulic motor and/or the actuator of the hydraulic pump in order to maintain a constant speed of travel.

BACKGROUND OF THE INVENTION

Hydraulic drives are employed in many working vehicles, such as agricultural vehicles and harvesting machines. Such a hydraulic drive comprises a pump driven by an internal combustion engine, which pump is hydraulically connected (by a hydraulic fluid) to a hydraulic motor which drives one or more wheels. In many vehicles, wheels of the front and rear axles are driven by respective hydraulic motors, with one or more such motors serving the wheels of a given axle. Often with such motors, the displacement volume of the hydraulic motor is variable, as is the displacement volume of the associated pump.

Such a vehicle is disclosed in EP 1,223,069 A. An internal combustion engine drives the adjustable hydraulic pump, which pump is hydraulically connected (by a hydraulic fluid) to the adjustable hydraulic motors, each of which motors serves to drive one axle. The rotational speed of each motor and the pressure at the inlet and outlet of the motor are measured. An electronic control unit is connected to a control lever, and controls the swash plates of the hydraulic motors and hydraulic pump. According to this reference, the traverse angles of the hydraulic pump and the hydraulic motors are adjusted in accordance with the speed setting of the control lever. If the rotational speeds of the axles mutually differ, which is suggestive of slipping, the hydraulic motor associated with the slipping is adjusted. The other hydraulic motor(s) and the hydraulic pump are adjusted in order to maintain a constant speed of travel. The manner of control of the hydraulic pump is hot further described.

The underlying problem of the present invention is deemed to be to devise a drive system for a working vehicle, which system provides improved control of the hydraulic pump and hydraulic motors. In addition it is sought to provide means of improved braking.

SUMMARY OF THE INVENTION

The drive system of the working vehicle, which vehicle may particularly be a harvesting machine, comprises a main engine, which as a rule is an internal combustion engine. The main engine drives a hydraulic pump directly or indirectly (e.g. via the intermediary of transmission means which may be mechanical, hydraulic, or other). The hydraulic pump is connected to two hydraulic motors via a hydraulic line; each such hydraulic motor mechanically drives at least one wheel which engages the ground (or each such hydraulic motor mechanically drives a caterpillar track). The hydraulic motors are associated with different axles (or equivalent) of the working vehicle. A control device is connected to a sensor which senses the position of a speed-setting device, e.g. a control lever or gas pedal. The control device is also connected to three actuators which respectively adjust the displacement volume of the first hydraulic motor, second hydraulic motor, and hydraulic pump.

In normal operation, the control device shifts the actuators into positions whereby the working vehicle advances at a speed which the operator controls via the speed-setting device.

The operating conditions of at least one wheel are monitored. If an undesirable operating condition occurs, e.g. slipping, which condition can be detected via the rotational speeds of the wheels, or if braking action of a wheel occurs, which braking action can be detected by the difference in pressure between the inlet and outlet of the hydraulic motor, the displacement volume of the given hydraulic motor can be reduced. At the same time it is desired not to change the speed of travel of the vehicle. In this connection it is proposed that in such a situation first one increases the displacement volume of the other hydraulic motor which is not involved in the undesirable operating condition; when needed, this increase may be up to the maximum displacement volume. If (and only if) this increase is insufficient to maintain the speed of the operating vehicle constant, and the other hydraulic motor is accommodating the entire volume made available by the adjustment of the hydraulic motor involved in the undesirable operating condition, one proceeds to reduce the displacement volume of the hydraulic pump.

In this manner one arrives at a relatively simple, procedure for the control device in the event of an undesirable operating condition.

Alternatively, it is proposed to connect the control device of the drive system of the working vehicle (which vehicle in particular may be a self-propelled harvesting machine) to a parking brake actuator. If the speed-setting device is moved relatively rapidly in the direction of the neutral position, e.g. at a speed of movement of the speed-setting device which exceeds a prescribed threshold value, the parking brake provides additional braking to enhance the braking action of the hydraulic motor. In an emergency braking situation, this enables more, rapid stopping of the working vehicle. A proportional valve may be employed for control of the parking brake actuator, in order to facilitate obtaining intermediate values of the braking action (retardation).

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE EMBODIMENTS

Figure 1:
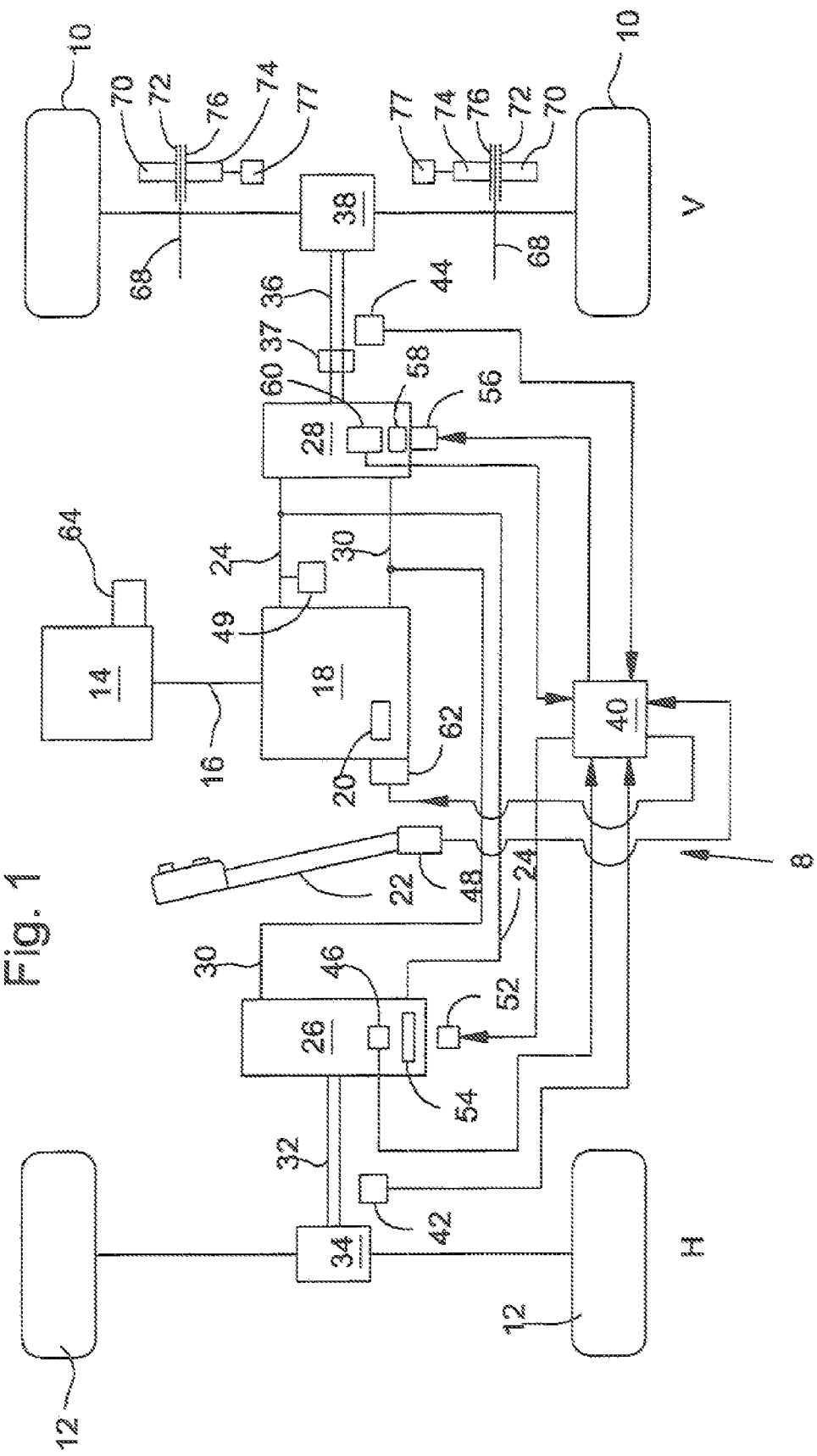
FIG. 1 is a schematic of a drive system embodying the principles of the present invention.

FIG. 1 an embodiment of an inventive drive system is shown schematically. A working vehicle 8 has a frame or self-supporting chassis (not shown) which is borne on front wheels 10 and rear wheels 12; these wheels engage the ground. As a rule, the rear wheels are steerable, whereas the front wheels 10 have a larger diameter than the rear wheels and bear most of the weight of the working vehicle 8, particularly for a working vehicle in the form of a harvesting machine (e.g. a thresher harvester, cotton picker, or self-propelled chopper harvester). Accordingly, the front wheels 10 are more critical to the traction situation than the rear wheels 12. With other embodiments of working machines, e.g. tractors or sugar cane harvesters, the positions of the rear and front wheels (12, 10) may be respectively reversed.

The drive system comprises a main engine 14 in the form of an internal combustion engine (e.g. diesel engine). The main engine 14 drives a hydraulic pump 18 via a shaft 16. The fluid displacement of the pump 18 is variable by means of a swash plate 20, the position of which is variable by means of a control lever 22 disposed in a driver's cabin of the working vehicle 8. The hydraulic pump 18 has an outlet which is connected via lines 24 to the inlet of a first hydraulic motor 26 and the inlet of a second hydraulic motor 28. One inlet of the hydraulic pump 18 is connected via lines 30 to the outlet of the first hydraulic motor 26 and the outlet of the second hydraulic motor 28. If the working vehicle 8 is a self-propelled harvesting machine, the main engine 14 also drives the materials-processing devices and the materials-conveying devices.

The two rear wheels 12 are driven by the first hydraulic motor 26, via a first drive shaft 32 and a first limited-slip differential 34. The two front wheels 10 are driven by the second hydraulic motor 28, via a second drive shaft 36 and a second limited-slip differential 38. The first hydraulic motor 26 can be selectively switched in and out, so that four-wheel drive may be employed particularly for special operating situations in which improved traction is required.

Between the second hydraulic motor 28 and the second differential 38, a gear shift mechanism or the like 37 is provided which has various selectable transmission ratio stages. These stages of the gear shift mechanism 37 can be changed manually, preferably while underway, by mechanical, electromechanical, or hydraulic means. Alternatively, the shifting of transmission ratio may be automatic, such as described in DE 102 60 480 A, the disclosure of which is incorporate herein by reference.

For rearward travel, the flow directions in the lines 24 and 30 are reversed by appropriate changes in the setting of the swash plate 20 associated with the hydraulic pump 18.

A control device 40 is connected to a first rotational speed sensor 42 a second rotational speed sensor 44, and a first pressure sensor 46. The first rotational speed sensor 42 is disposed close to the first drive shaft 32, and delivers a pulse (or a series of pulses) with each rotation of the first drive shaft 32. The second rotational speed sensor 44 is adapted to the second drive shaft 36 on the output side of the gear shift mechanism 37, and delivers a pulse (or a series of pulses) with each rotation of the second drive shaft 36. The pressure sensor 46 is disposed in the interior space of the first hydraulic motor 26, and it senses the pressure which prevails at the outlet of said first hydraulic motor 26.

The control device 40 is also connected to an electromechanical actuator 52 which is configured to shift a swash plate 54 associated with the first hydraulic motor 26. Information about the position of the first actuator 52 can be fed back to the control device 40. If the first actuator 52 is in the form of a stepping motor, this feedback may be unnecessary.

The second hydraulic motor 28 also has a fluid displacement which is modifiable by means of an electromechanical second actuator 56 and an adjustable swash plate 58. Information about the position of the second actuator 56 can be fed back to the control device 40. The second hydraulic motor 28 has a second pressure sensor 60 associated with it which measures the pressure at the outlet of the second hydraulic motor 28. The control device 40 is connected to the pressure sensor 60 and the actuator 56.

A third actuator 62 is provided, for shifting the position of the swash plate 20 of the hydraulic pump 18, which actuator 62 operates electromechanically or electrohydraulically and is controlled by the control device 40. It is possible that means of feedback to the control device 40 of information about the instantaneous position of the third actuator 62 are provided.

A position sensor 48 for the control lever 22 is associated with said control lever 22, to serve as an indicator of the speed control setting. This control lever position sensor 48 determines the current position of the control lever 22 optically or magnetically and communicates same to the control device 40.

In normal operation, the control device 40 controls the actuators 52, 56, and 62 in a manner which is per se known, such that the working vehicle 8 moves at a speed which corresponds to the communicated setting of the control lever 22. In this connection, the displacement volume of the swash plate 20 of the hydraulic pump 18 can be adjusted, e.g. proportionally to the signal indicating the drive force speed—i.e. the signal from the control lever position sensor 48 of the speed-setting control lever 22, up to a specified limit speed, while the displacement volumes of the swash plates (54, 58) of the hydraulic motors (26, 28) are set to their maximum values for speeds below the specified limit speed, and, as soon as the displacement volume of the swash plate 20 of the hydraulic pump 18 reaches its maximum, at the limit speed (wherewith at higher speeds the displacement volumes of the, swash plate 20 of the hydraulic pump 18 remains the same) said displacement volumes of the swash plates (54, 58) are reduced so as to result in the desired speed. The value of the aforesaid limit speed depends on the currently chosen transmission ratio of the shift mechanism (transmission mechanism) 37.

The second rotational speed sensor 44 delivers to the control device 40 a signal which represents the rotational speed of the front wheels 10. In addition, the first rotational speed sensor 42 provides information about the rotational speed of the rear wheels 12, to the control device 40. The control device 40 also has information about the transmission ratio between the shafts and the wheels, where here the shafts are the shafts (32, 36) with which shafts the rotational speed sensors (42, 44) interact, and the wheels are the wheels (10, 12); and also information concerning the outer diameters of the wheels (10, 12).

Figure 2:
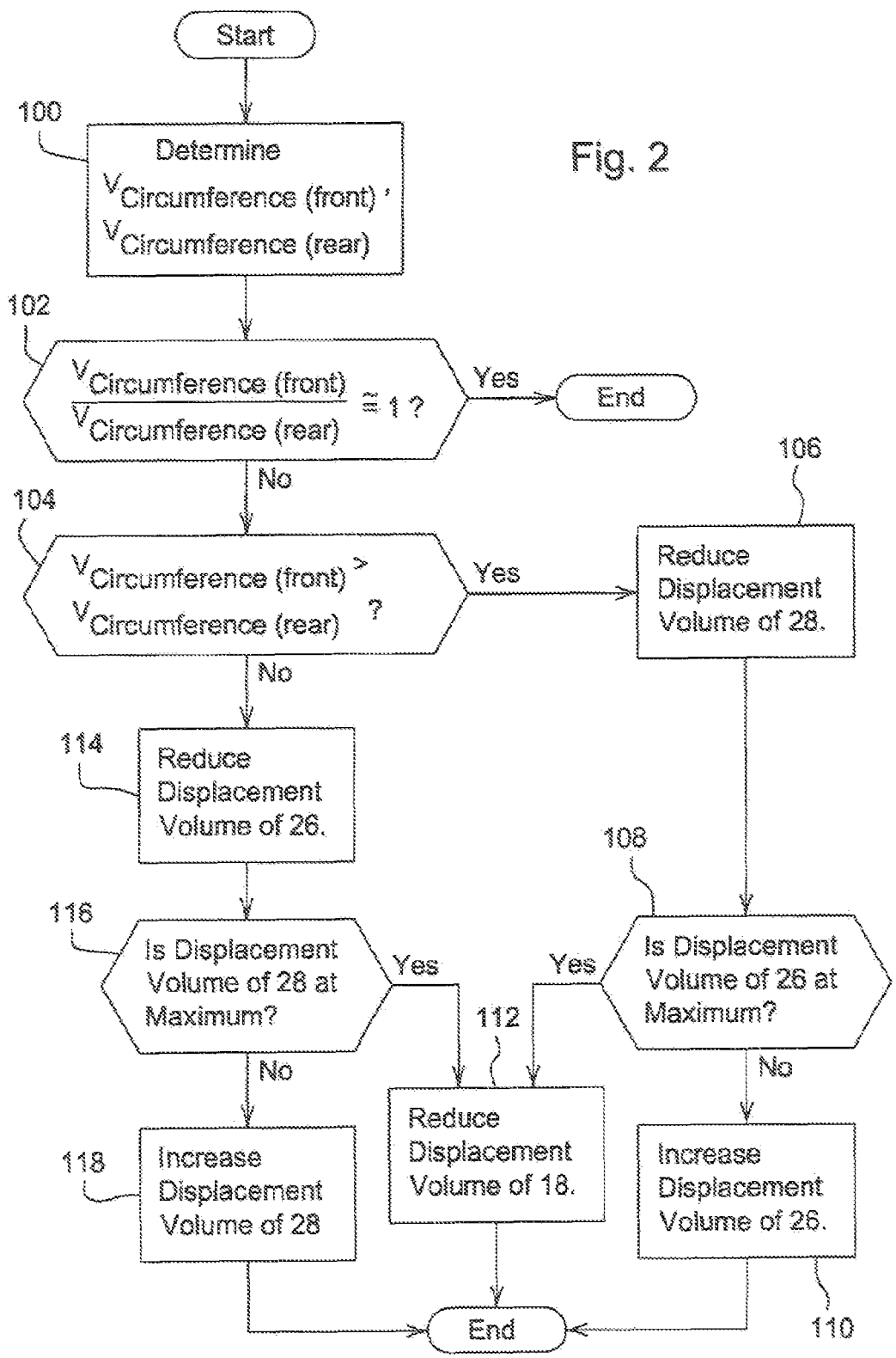
FIG. 2 is a flow diagram illustrating the procedure of the control device when slipping occurs.

In order to avoid spinning or skidding of the wheels (10, 12) under operating conditions when slipping occurs, typically the control device 40 will carry out a routine such as illustrated in FIG. 2.

The control device 40 calculates (step 100 in FIG. 2) a ratio of the circumferential speed of the front wheels 10 to the circumferential speed of the rear wheels 12. If this ratio is 1 or differs insignificantly from 1 (step 102), no further measures are needed.

If the ratio of the circumferential speed of the front wheels 10 to the circumferential speed of the rear wheels 12 is greater than 1 (step 104), it may be assumed that the front wheels 10 are spinning. The control device 40 then causes the actuator 56 (step 106) to bring the swash plate 58 into a position in which the speed of the second hydraulic motor 28 reduced, i.e. in which the displacement volume of said motor is reduced. In order to maintain the speed of the rear wheels 12 constant under these circumstances, the control device 40 first checks (step 108) whether the displacement volume of the first hydraulic motor 26 is at the maximum value. If this is not the case, the actuator 52 (step 110) is controlled so as to increase the displacement volume of the first hydraulic motor 26. This causes the first hydraulic motor 26 to rotate more slowly, and said first hydraulic motor 26 absorbs the additional hydraulic flow which can no longer be absorbed by the second hydraulic motor 28 because of the adjustment of the swash plate 58. However, if the swash plate 54 of the first hydraulic motor 26 has already been adjusted to the maximum displacement volume, or if it cannot be adjusted to the extent which would be necessary to accommodate the additional volume made available, the control device 40 causes the actuator 62 (step 112) to bring the swash plate 20 of the hydraulic pump 18 into a position in which a hydraulic flow is delivered which has been reduced to the extent to which the displacement capability of the second hydraulic motor 28 has been reduced. The swash plate 54 of the first hydraulic motor 26 has been or snow adjusted to the maximum displacement volume.

If the ratio of the circumferential speed of the front wheels 10 to the circumferential speed of the rear wheels 12 is less than 1 in step 104, it may be assumed that the rear wheels are spinning. The control device 40 then causes the actuator 54 (step 114) to bring the swash plate 54 into a position in which the speed of the first hydraulic motor 26 is reduced. In order to maintain the speed of the front wheels 10 constant under these circumstances, the control device 40 first checks (step 116) whether the displacement volume of the second hydraulic motor 28 is already at the maximum value. If this is not the case, the actuator 56 (step 118) is controlled so as to increase the displacement volume of the second hydraulic motor 28. This causes the second hydraulic motor 28 to rotate more slowly, and said motor 28 absorbs the additional hydraulic flow which can no longer be absorbed by the first hydraulic motor 26 because of the adjustment of the swash plate 54. However, if the swash plate 58 of the second hydraulic motor 28 has already been adjusted to the maximum displacement volume, or if it cannot be adjusted to the extent which would be necessary to accommodate the additional volume made available, the control device 40 causes the actuator 62 (step 112) to bring the swash plate 20 of the hydraulic pump 18 into a position in which a hydraulic flow is delivered which has been reduced to the extent to which the displacement capability of the first hydraulic motor 26 has been reduced. The swash plate 58 of the second hydraulic motor 28 has been or is now adjusted to the maximum displacement volume.

This control strategy reflects an assumed physical situation in which the wheels of one of the axles (i.e. the front or rear wheels) have reduced ground contact at the same time that the wheels of the other axle have sufficient contact to exert the available torque on the ground.

Figure 3:
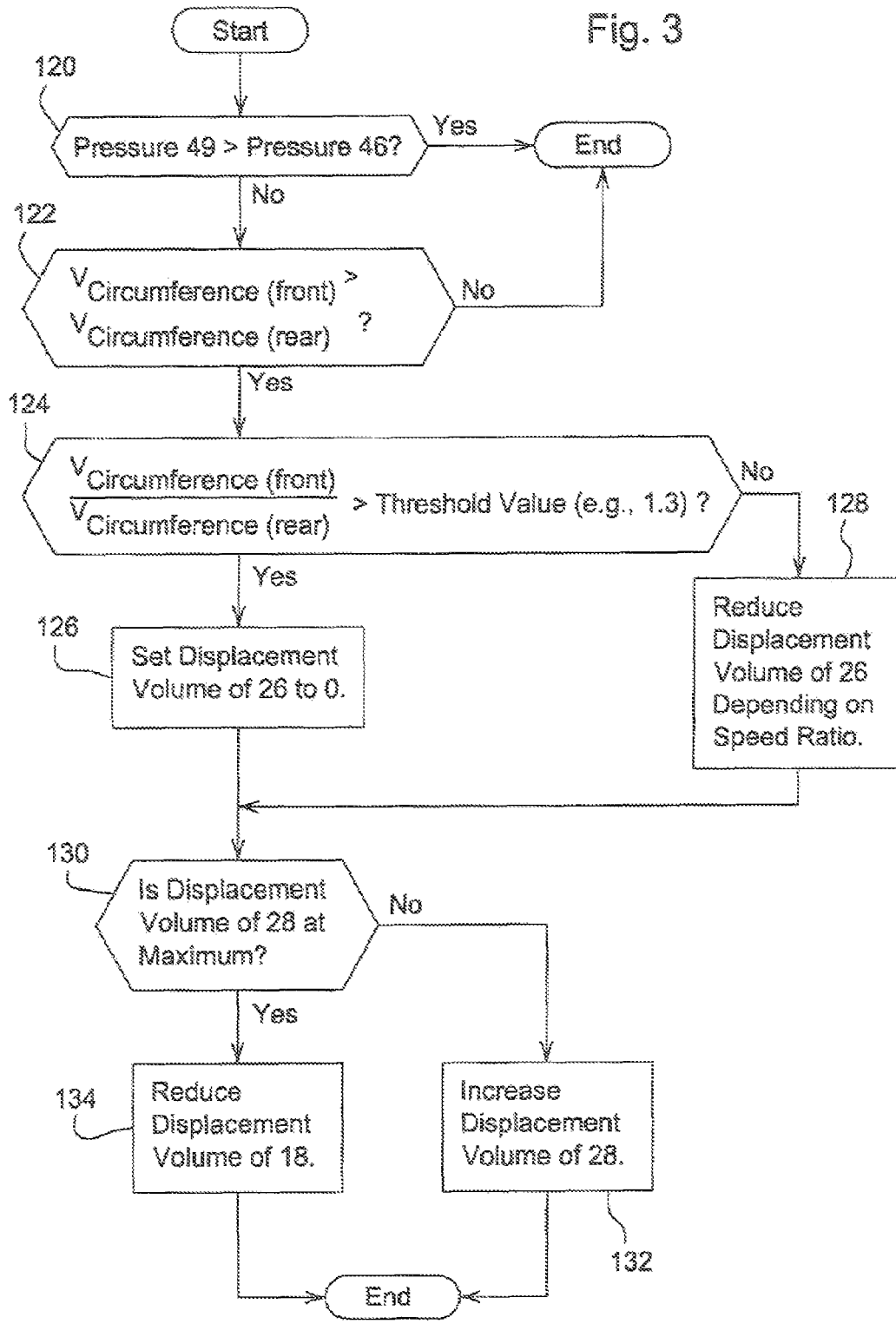
FIG. 3 is a flow diagram illustrating the procedure of the control device when the rear wheels are exerting a braking action, or in a condition of engine braking.

During engine braking, the operating state of the rear wheels 12 is monitored and controlled with a routine such as illustrated in FIG. 3. The control device 40 determines the prevailing pressure at the inlet of the first hydraulic motor 26, by means of a third pressure sensor 49. This measured value is compared with the pressure at the outlet of the hydraulic motor 26 (step 120, FIG. 3) which is measured by the pressure sensor 46.

The comparison allows determination of the operating state of the first hydraulic motor 26. If the pressure at the inlet is greater than the pressure at the outlet, the first hydraulic motor 26 applies its output and propels the working vehicle 8 forward, and the routine in FIG. 3 terminates. If the pressure at the inlet is less than the pressure at the outlet, the rear wheels 12 are in a dynamic braking situation (engine braking), e.g. when traveling downhill. In order to avoid spinning of the rear wheels 12 or a backspin effect, if in addition the front wheels 10 are rotating more rapidly than the rear wheels 12 (step 122), the control device 40 causes the actuator 52 to shift the swash plate 54 in the direction of lower speed (step 128). The degree of shifting depends on the speed difference. If this difference exceeds a threshold of, e.g., 30% (step 124), the hydraulic motor 26 is completely shut off (step 126). For very small speeds, this procedure becomes unnecessary and is not carried out.

The shifting of the swash plate 54 is compensated for by shifting of he swash plate 58 (step 132), in order to maintain constant speed of progress of the working vehicle 8. If the displacement volume of the second hydraulic motor 28 is already at a maximum (step 130), then analogously to the procedure illustrated in FIG. 2 the displacement volume of the hydraulic pump 18 must be reduced (step 134). It should be noted that it would also be possible to carry out a corresponding monitoring of the front wheels 10 by means of the pressure sensor 60.

The routines illustrated are carried out at regular intervals, e.g. intervals of a few milliseconds, and the described shifts are reversed if the slipping (or the undesired braking action) of the wheels 10 or 12 does not persist.

In order to be able to quickly stop the vehicle in the case of hazard a service brake is provided which is comprised of a brake disc (68, 68) rotationally rigidly fixed to the axle of the front wheels 10, and a brake pad or the like 72 which can be pressed against the brake disc 68 by a brake cylinder 70. Each front wheel 10 and each rear wheel 12 may have a respective service brake associated with it. The brake cylinder 70 is actuated hydraulically by a pedal disposed in the driver's cabin, usually via the intermediary of a power braking unit. The service brake is also operative during street travel, wherein the vehicle speed is set via the control lever 22 or a gas pedal.

To maintain the operating vehicle 8 in a stopped position, a parking brake is also provided which is comprised of a brake cylinder 74 which serves as an actuator of the parking brake and which causes a brake pad or the like 76 to press against the brake disc 68. The brake pad 76 and brake cylinder 74 are disposed on the side of the brake disc 68 which is opposite to that on which the brake cylinder 70 and the brake pad 72 are disposed. Each front wheel 10 and each rear wheel 12 may have a respective parking brake associated with it. The brake cylinder 74 is connected to and is controlled by the control device 40. The parking brake is manually actuated by the operator by means of a suitable switch or the like, or is automatically actuated by the control device 40 when the working vehicle is in a stopped state, in order to prevent undesirable rolling of the vehicle.

As mentioned, in harvesting mode the speed of the working vehicle 8 is controlled by the control lever 22, whereas during street travel the speed may be controlled by the control lever 22 or by a gas pedal. Street travel mode may be selected by a switch (to switch between harvesting mode and street travel mode) or may be automatically recognized from the operating state of the working elements of the working vehicle 8. In street travel mode, the control device 40 causes an engine control 64 of the main engine 14 to reduce the rotational speed of the main engine 14 so as to reduce fuel consumption.

In harvesting mode and possibly also in street travel mode, the control lever 22 is used as the exclusive means of controlling the speed of travel of the working vehicle. If a gas pedal is used to set the speed in street travel mode, a sensor associated with the gas pedal and connected to the control device 40 is provided, to sense the position of the gas pedal analogously to the control lever sensor 48; the gas pedal will then substitute for the control lever 22, whereas the other working elements will be controlled by the control device 40 as during harvesting mode.

If the control lever 22 (or the gas pedal) is moved toward its neutral position, a desired deceleration of the working vehicle 8 occurs, as a result of braking action of the hydraulic motors (26, 28). This braking action is limited by the parameters of the hydraulic motors (26, 28). If the control lever 22 or the gas pedal is moved relatively rapidly to its neutral position, in order to be able to, e.g., stop the working vehicle 8 relatively rapidly in an emergency, enhanced braking action is achieved in that the control device 40 actuates the braking cylinder(s) 74 of the parking brake. This can quickly stop the working vehicle. In this connection, the braking cylinder(s) 74 may be actuated if the time rate of change of the position signal from the control lever sensor 48 (or a corresponding sensor for sensing the position of the gas pedal) exceeds a prescribed threshold value. Preferably, the brake cylinder 74 is controlled via a proportional valve 77, so that intermediate values of the braking action are achievable.

In accordance with the provisions of the patent statutes, the present invention has been described in what is considered to represent its preferred embodiment. However, it should be noted that the invention can be practiced otherwise than as specifically illustrated and described.

What is claimed is:

1. The drive system of a working vehicle comprising:
   a main engine drivingly connected to a hydraulic pump that has a variable displacement volume controlled by an actuator, the hydraulic pump being drivingly connected to a hydraulic motor that is drivingly connected to a first wheel engaging the ground, the actuator being connected to a control device that is connected to a sensor configured to sense a position of a speed setting control lever;
   the control device being configured to adjust the actuator in response to movement of the speed setting control lever, the first wheel being engageably connected to a parking brake that is actuatable by a parking brake actuator; and
   wherein the control device is connected to the parking brake actuator and is configured to actuate the parking brake if the speed setting control lever is moved toward a neutral position at a rate of change in a control lever position that exceeds a threshold value.

2. The drive system according to claim 1, further including a proportional valve that controls the parking brake actuator.

3. The drive system of claim 1 wherein said drive system is adapted for use in one of a harvesting machine, a thresher harvester, a cotton picker, and a self-propelled chopper harvester.

* * * * *